US007035588B2

(12) United States Patent
Sim et al.

(10) Patent No.: US 7,035,588 B2
(45) Date of Patent: Apr. 25, 2006

(54) HEADSET HAVING A SHORT-RANGE MOBILE SYSTEM

(75) Inventors: Seong-Wook Sim, Songnam-shi (KR); Joung-Kyou Park, Suwon-shi (KR); Dong-Jun Cho, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 794 days.

(21) Appl. No.: 09/891,836

(22) Filed: Jun. 26, 2001

(65) Prior Publication Data

US 2002/0002035 A1 Jan. 3, 2002

(30) Foreign Application Priority Data

Jun. 28, 2000 (KR) ................................ 2000-35987

(51) Int. Cl.
*H04B 5/00* (2006.01)
(52) U.S. Cl. ...................................... 455/41.2; 455/41.3
(58) Field of Classification Search ............... 379/88.1, 379/88.11, 88.13; 455/15, 41.2, 41.3, 412.1, 455/414.3, 414.4, 509
See application file for complete search history.

(56) References Cited

U.S. PATENT DOCUMENTS

| | | | | |
|---|---|---|---|---|
| 4,692,945 A | * | 9/1987 | Zdunek | 455/17 |
| 4,961,216 A | * | 10/1990 | Baehr et al. | 340/7.31 |
| 5,062,132 A | * | 10/1991 | Yasuda et al. | 455/557 |
| 5,802,469 A | | 9/1998 | Nounin et al. | |
| 5,940,769 A | * | 8/1999 | Nakajima et al. | 455/509 |
| 6,006,189 A | * | 12/1999 | Strawczynski et al. | 704/270 |
| 6,069,888 A | * | 5/2000 | LaRocca | 370/342 |
| 6,104,333 A | * | 8/2000 | Wood, Jr. | 341/173 |
| 6,181,926 B1 | * | 1/2001 | LaRocca | 455/413 |
| 6,272,332 B1 | * | 8/2001 | Matsumoto et al. | 455/412.1 |
| 6,289,213 B1 | * | 9/2001 | Flint et al. | 455/420 |
| 6,298,231 B1 | * | 10/2001 | Heinz | 455/413 |
| 6,359,872 B1 | * | 3/2002 | Mahany et al. | 370/338 |
| 6,385,306 B1 | * | 5/2002 | Baxter, Jr. | 379/88.13 |
| 6,636,733 B1 | * | 10/2003 | Helferich | 455/412.2 |
| 6,691,173 B1 | * | 2/2004 | Morris et al. | 709/249 |
| 6,766,163 B1 | * | 7/2004 | Sharma | 455/412.1 |

OTHER PUBLICATIONS

Jaap C. Haartsen, "The Bluetooth Radio System", IEEE Personal Communications, IEEE Communications Society, US, vol. 7, NR. 1, pps. 28-36 XP000908653.

(Continued)

*Primary Examiner*—Bing Q. Bui
(74) *Attorney, Agent, or Firm*—Dilworth & Barrese LLP

(57) ABSTRACT

A method for fast transmission of large amounts of data stored in a memory of a main part to a slave by using a short-range mobile system is disclosed. The method comprises the steps of requesting transmission of data stored in the memory of the main part, establishing a selected radio link between the main part and the slave in response to the request for transmission of data, transmitting indexing information related to the kinds of data stored in the memory of the main part through the selected radio link, and transmitting data corresponding to the indexing information selected to the slave through the radio link.

13 Claims, 7 Drawing Sheets

OTHER PUBLICATIONS

European Search Report, Application No. EP 01 11 5819, May 6, 2002.

Stephanie Miles, "Ericsson answers the all for MP3", CNET News.Com, Online!, Nov. 19, 1999, XP002182565.

Davies, et al., "Supporting Adaptive Video Applications in Mobile Environments," *IEEE Communications Magazine*, Jun. 1998, pp. 138-143.

Chinese Office Action dated Sep. 26, 2003 issued in a counterpart application, namely, Appln. No. 01125481.5.

* cited by examiner

HEADSET HAVING A SHORT-RANGE MOBILE SYSTEM

PRIORITY

This application claims priority to an application entitled "HEADSET HAVING A SHORT-RANGE MOBILE SYSTEM" filed with the Korean Industrial Property Office on Jun. 28, 2000, and assigned Patent Application Serial No. 2000-35987, the contents of which are hereby incorporated by reference.

BACKGROUND OF THE INVENTION

1. Field of the Invention

The present invention relates generally to a short-range mobile communication system, and more particularly, the present invention relates to a slave apparatus of a short-range mobile communication system operating in within a walking distance for receiving data stored in a master apparatus through a given radio link, and a method for receiving data.

2. Description of the Related Art

A short-range mobile communication system is an apparatus and means for transmitting or receiving message data and voice data in real time between electrical products usually located within a diameter of 10 meters from each other, such as a cellular phone, notebook computer, desk top device and so on. The short-range mobile communication system usually consists of a master device transmitting data and a plurality of slave devices receiving data. However, the master would be considered a slave if it only receives data. That is, the function of a master or a slave is not fixed.

The most well known short-range mobile communication systems is a method known as Bluetooth™, that has been suggested by Ericsson and Nokia. The Bluetooth™ application allows various electrical products, such as a mobile terminal, notebook computer, facsimile and MP3 player, to be accessed by each other through a radio link. The detailed transmission standard that has been suggested by Bluetooth™ has an advantage to make products highly protected from interference and provides security of data. Radio communication means using the Bluetooth™ application could be manufactured very small, like a microchip, that is easily attached or incorporated into electrical products. Furthermore, radio communication means using the Bluetooth™applications are designed to use the frequency band of 2.4 GHz, and are capable of communicating all over the world. The Bluetooth™ standard designates two power levels. At low powers levels it is designed to operate within a room, while at high power levels, it is designed to operate within the whole house.

The Bluetooth™ radio technology is designed to work on both point-to-point access and point-to-multipoint access. According to the Bluetooth™ standard, a master can concurrently communicate with a maximum of seven slaves. However, communication between a mobile phone and a headset using conventional Bluetooth™radio technology is usually implemented through a Synchronous Connection Oriented (hereinafter SCO) link that is usually a full duplex link and point-to-point access for voice communication. Referring to FIG. 1, the master 1 and the slave 2 comprise a short-range mobile communication system. Namely, the master 1 consists of the main part 3 and a short-range mobile system 4. The main part 3 includes a control unit 5 controlling the whole operation of the master 1 and memory 6 storing data, for example an MP3 file, received from computers or wire/wireless communication means. The short-range mobile system 4 attached to or incorporated into said main part 3 is the same or similar to the structure of other wireless systems. That is, the short-range mobile system 4 consists of a base band module 8 connected to the main part 3, a memory 9 for storing programs for controlling the operation of the baseband 8, transceiver 7 and antenna 10.

Meanwhile, the slave 2 also consists of a short-range mobile system 4' that is the same or similar to the short-range mobile system 4 attached to or incorporated in the master 1, and a headset 11. The headset 11 consists of PCM decoder/encoder 12 for decoding data received from the short-range mobile system 4', speaker/earphone 13 for transforming data provided by the PCM decoder/encoder 12 to audio data, and a mic 14 for transforming voice signal of a user to an electrical signal. Therefore, in order for the slave 2 to receive data from the master 1, an SCO radio link is usually established between them. The SCO link is designed to require the use of TDD (Time Division Duplex) and has no problem with a maximum 64 Kbps of transmission of voice and short message data. However, when the short-range mobile systems 4 and 4' are linked by SCO radio link and a user wants to receive an MP3 file, the MP3 file can not be properly transmitted in time because of the large size of the file.

Now, to solve the above problems, an Asynchronous Connection-Less (hereinafter called ACL) link has been recommended as an alternative method for transmitting data quickly in a short-range mobile system. The ACL link is designed to use the method of packet switching, while the SCO link is designed to use the method of circuit switching. Therefore, the ACL link transmits data faster than the SCO link even in the same frequency band. If the main part 1 is designed to use both a low speed radio link and a high speed radio link, the master 1 selects only one pertinent radio link just before data transmission.

The method of data transmission using the ACL link for a high speed data transmission between the master 1 and slave 2, was disclosed in the Bluetooth™ standard and conference documents presented by Dr. Jaap Haartsen of Ericsson on Jul. 9, 1999 in Toyko, Japan. According to the standard and documents with respect to Bluetooth™, the control 5 of the master 1 determines what kind of data is transmitted; a low speed data-voice, short message data less than 30 letters, or a high speed data-MP3 file, picture file. After determining the kind of data, the baseband 8 of the master 1 of the short-range mobile system 4 establishes a selected radio link. However, although the ACL link and the method of multiple packet transmission was disclosed, no information is provided in the case of a large file, like an MP3 file, which is transmitted to a slave 2 through a short-range mobile system, and how the slave 2 selects the received data and outputs the data.

SUMMARY OF THE INVENTION

It is therefore an object of the present invention to provide a method and means for fast transmission of data stored in memory of a master to a slave through a given radio link, wherein said master and slave, respectively, each include a short-range mobile system in which to communicate using the given radio link.

It is another object of the present invention to provide a method for transmitting audio data stored in memory of a telephone to a headset, wherein the telephone and the headset, respectively, each include a short-range mobile system in which to communicate using the given radio link.

It is still another object of the present invention to provide a method for transmitting brief information with respect to audio data stored in memory of a telephone to a headset through a given radio link.

It is still further another object of the present invention to provide a method that allows a user to select specific data based upon brief information stored as audio data in memory of a telephone which is transmitted to a headset through a given radio link.

It is still further another object of the present invention to provide a decoding means for decoding digital audio data that is received through a given radio link.

According to an aspect of the present invention, there are provided slaves for receiving data stored in memory of a master through one of a plurality of radio links that is selected by the master. Each slave includes a short-range radio receiver for receiving data through the selected radio link and a first decoder for decoding a low speed data transmitted over a radio link for a low speed transmission and a second decoder for decoding a high speed data transmitted over a radio link for a high speed transmission, and a converter for converting data decoded by the first or second decoder into audio data.

In addition, there is also disclosed a method for transmitting data stored in a memory of a master to a plurality of slaves through a selected radio link, which comprises the steps of:

requesting transmission of data, which is stored in a memory of the master;

establishing a selected radio link between the master and at least one slave in response to the request for data transmission;

transmitting brief information with respect to data stored in memory of the master through the radio link; and transmitting data corresponding to selected brief information to the slave through the radio link.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
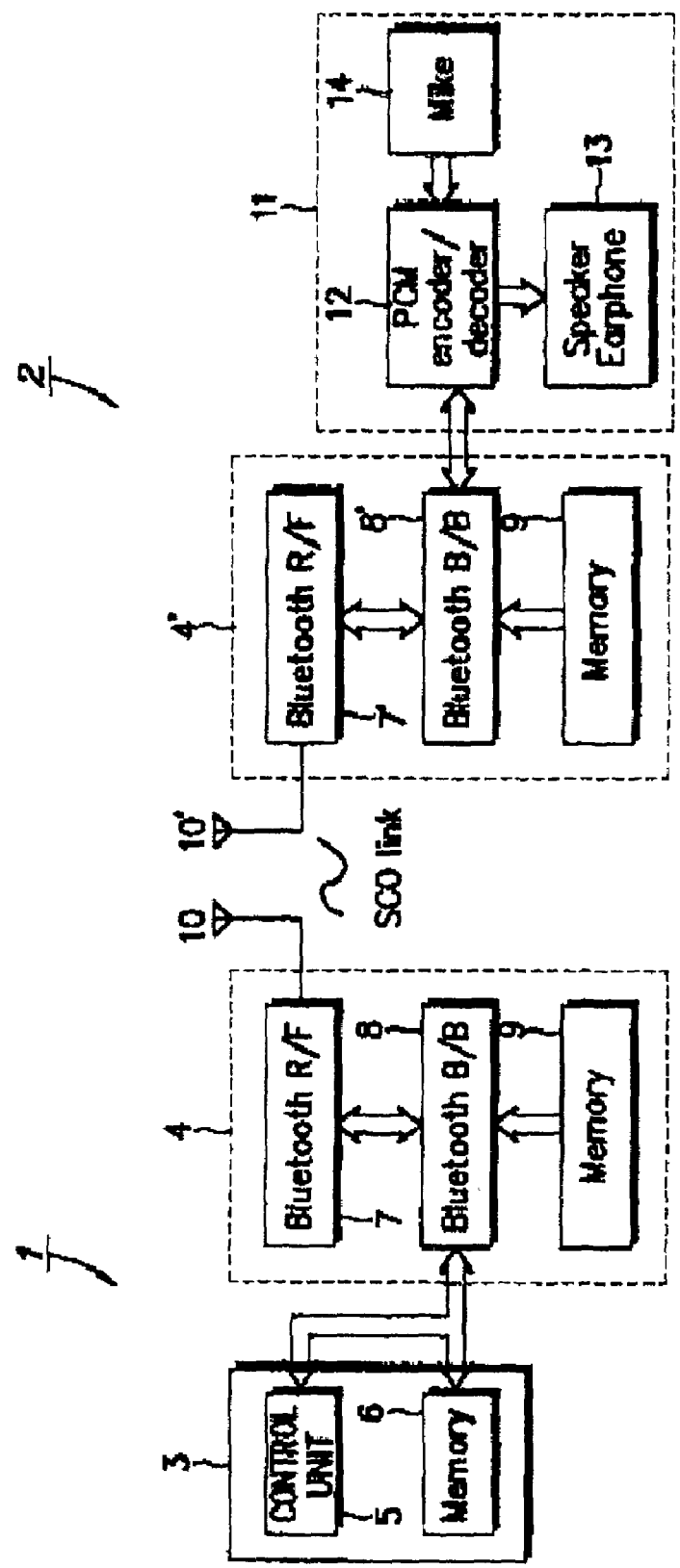
FIG. 1 is a block diagram showing a conventional structure of a phone and headset having an MP3 function.
Figure 2:
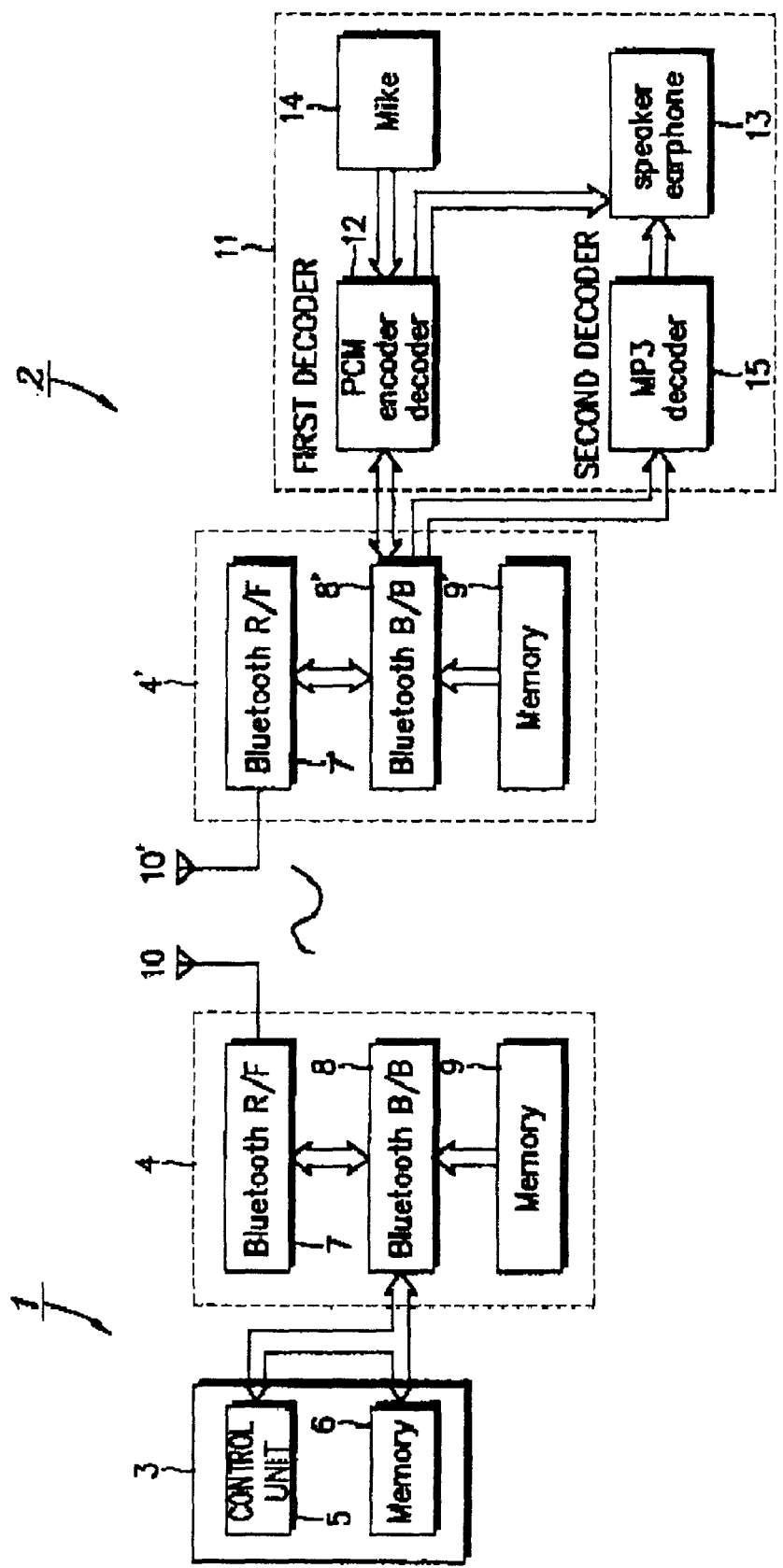
FIG. 2 is a block diagram showing a structure of a master unit and a slave unit as a headset according to the present invention.

FIG. 2 illustrates the structure of both a master unit and a slave unit each of which includes a short range radio mobile communication system communicating through a radio link, corresponding to a preferred embodiment of this invention.

As shown in FIG. 2, a master 1 consists of a main part 3, for example a telephone, notebook personal computer or MP3 player, and a short-range mobile system 4. The main part 3 includes a control unit 5 that controls operations of the master 1 which will be explained in detail hereinafter, and a memory 6 that stores data received from a computer or wire/wireless communication means. Meanwhile, the short-range mobile communication system 4 has a similar structure as a normal mobile communication system using Bluetooth™ standard. That is, the short-range mobile system 4 consists of baseband 8 that is connected to the main part 3 to transmit and receive data, and a memory 9 storing a program for controlling the operation of the baseband 8. The short-range mobile system 4 also includes a transceiver 7 that is connected to the baseband 8 to decode and encode data, and antenna 10 is connected to the transceiver 7 for transmitting and receiving data in radio frequency (RF).

If the control unit 5 receives a message, requesting data transmission from a remote control means (not shown), the control unit 5 determines whether the message request is for a high speed data transmission or a low speed data transmission. After determining the kind of message request for data transmission, the control unit 5 controls the baseband 8 of the short-range mobile system 4 to select a pertinent radio link among the SCO link or the ACL (Asynchronous Connection-less) link.

The slave 2 consists of a headset 11 and a short-range mobile system 4' that is similar to the short-range mobile system 4. The short-range mobile system 4' consists of an antenna 10' for receiving RF signals transmitted from the master unit 1, and a transceiver 7' for transforming received RF signals into digital signals. The short-range mobile system 4' also includes baseband 8' that is connected to transceiver 7' to process data digitized in the transceiver 7', and a memory 9' storing a program for controlling the operation of the baseband 8'.

The headset 11 consists of a first decoder 12 and a second decoder 15, which is connected to the baseband 8', respectively. The headset 11 also includes a speaker/earphone 13 that is connected to the first decoder 12 and the second decoder 15, and a mic 14 that is connected to the first decoder 12. The first decoder 12 decodes voice data and low speed data transmitted from the baseband 8' and transmits the data to the speaker/earphone 13. The first decoder 12 also encodes voice data transmitted from the mic 14 and transmits the encoded data to the baseband 8'. The second decoder 15 decodes a high speed data, for example an MP3 file, transmitted from the baseband 8' and provides the decoded data to the speaker/earphone 13. The speaker/earphone 13 converts data transmitted from the decoders 12 and 15 into analog signals, and then outputs the data. The mic 14 converts the voice signal of a user into electrical signals. Generally, the first decoder 12 uses a PCM decoder/encoder, and the second decoder 15 may use MAS-3507 chip manufactured by µNAS, for decoding MP3 files of.

Meanwhile, the baseband 8' includes a control means (not shown) that selects a specific radio link and a decoder related to a selected radio link under control of the control unit 5.

The short-range mobile system 4 of the master 1 and the short mobile system 4' of the slave 2 could be combined or incorporated on an other circuit board within the main part 3, or connected to the main part 3 as an additional adapter.

The slave unit 2, upon receiving an order for a radio link to be established, which is generated by the control 5 of the master 1, selects one the first decoder 12 and second decoder 15. If the selected radio link is a radio link for voice or a low speed data, the first decoder 12 decodes a call or a short message transmitted through a selected radio link. Whereas if the selected radio link is a radio link for an high speed data, the second decoder 15 decodes the high speed data, such as a sound or music, that is received through a selected radio link so that a user can listen to that music or sound.

The method of how to use a master 1 and a slave 2 of the present invention will now be explained in detail hereinafter.

Figure 3:
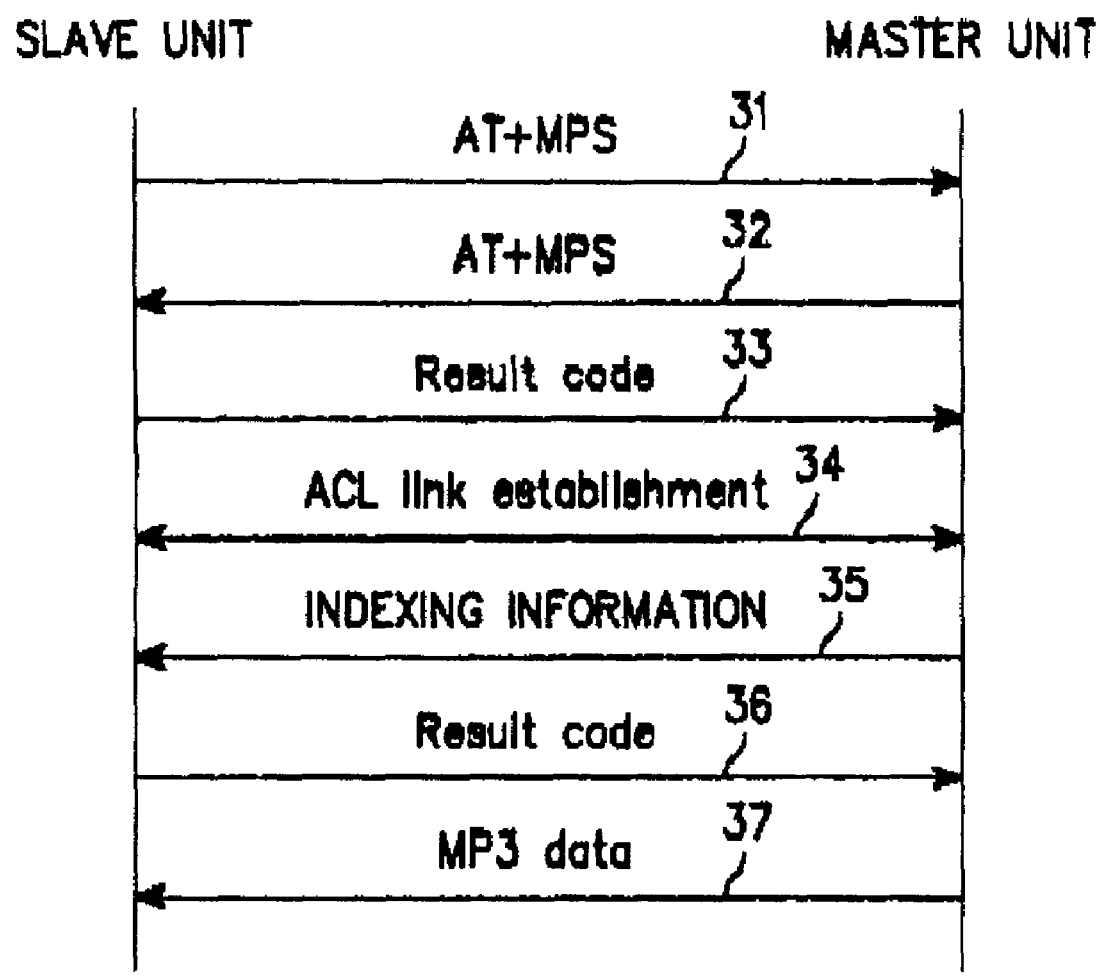
FIG. 3 illustrates an exemplary example of a preferred procedure transmitting data stored in memory of a master unit to a slave unit.

FIG. 3 shows procedures in which one of the slaves 2 receives an MP3 file that is stored in memory 6 of the master 1 through a short-range mobile system.

Referring to FIG. 3, a remote controller (not shown) transmits a message (AT+MPS) requesting the transmission of an MP3 file stored in memory 6 of a master 1, in order for the slave 2 to receive the MP3 file in step 31. After the control unit 5 receives the message from the remote controller, the control unit 5 of the master 1 transmits the same or similar message received by the control unit 5 to the slave 2 to check whether the received message (AT+MPS) is correct or not in step 32. The slave 2 transmits a message for operation (Result code) to the master 1 if the message transmitted from the master 1 is correct in step 33. A radio link for transmitting a high speed data in real time may be established between the master 1 and slave 2 in step 34. The master 1 transmits brief information about MP3 files that are stored in memory 6 of the master 1 to slaves 2 in step 35. The brief information may be related to the titles of songs, the size of the files, the operating time of the song, and so on. Therefore, a user is able to select one MP3 file that he wants to receive from among a plurality of MP3 files through the indexing information transmitted from the master 1. Once the user selects one MP3 file, the message requesting transmission is transmitted by the slave 2 in step 36. The master unit 1 transmits the file selected by the user from among the plurality of files stored in memory 6 of the master unit 1 to the slave unit 2 in step 37. If the message transmitted by the control unit 5 of the master 1 is error in step 32, the slave 2 transmits an error message to the master 1 in step 3 and the process restarts from step 31.

The radio link means can be one of infrared-communication, microwave and Asynchronous Connection-Less, being capable of high speed data transmission. The user preferably checks the indexing information on a display means or by a synthesized voice through a speaker/earphone of the headset.

Figure 5:
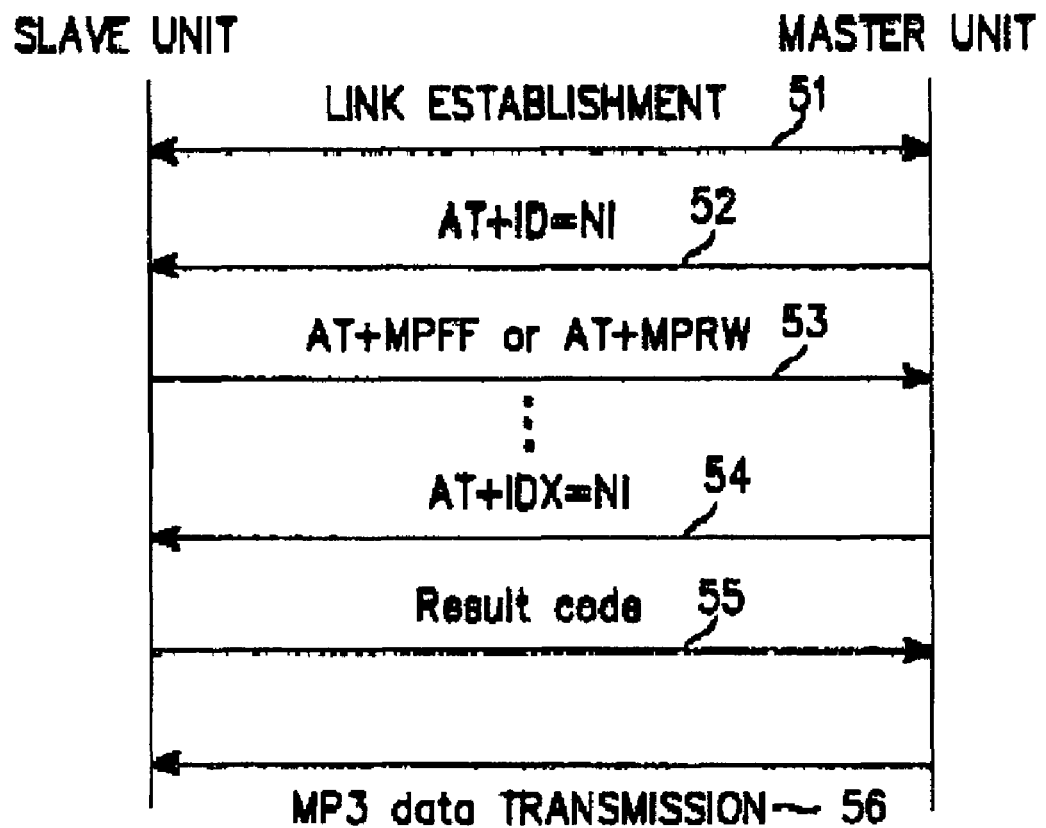
FIG. 5 illustrates an exemplary example of a preferred procedure in which a slave selects data stored in memory of a master unit.

FIG. 5 illustrates a detailed method by which a user selects data that he or she wants to receive through the indexing information transmitted from a master 1. That is, FIG. 5 shows a detailed method that may be followed after step 34 of FIG. 3.

As shown in FIG. 5, a radio link is established for transmitting data between the master 1 and the slave 2 in step 51. The master 1 transmits indexing information (AT+DX=Ni), which is related to an MP3 file, to the slave 2 after the radio link is established in step 52. The indexing information generally includes a title of a song, the size of the file, the operating time and file number, and a user can check these kinds of information by a display of a remote controller (not shown) or a speaker/earphone. The user usually uses buttons, such as a fast forward button (AT+MPFF) and a fast rewind button (AT+MPRW), on a remote controller in order to select which MP3 file he or she wants in step 53. The indexing information data selected by the user through a remote controller is transmitted from the master 1 to the slave 2 in step 54. The slave 2 transmits a confirmation message (Result code) to the master 1 through the remote controller in step 55. The master 1 checks out the confirmation message, and then transmits the requested data stored in memory 6 to the slave 2 in step 56. The indexing information that is transmitted to the slave 2 is the latest transmission information in step 52.

Figure 4:
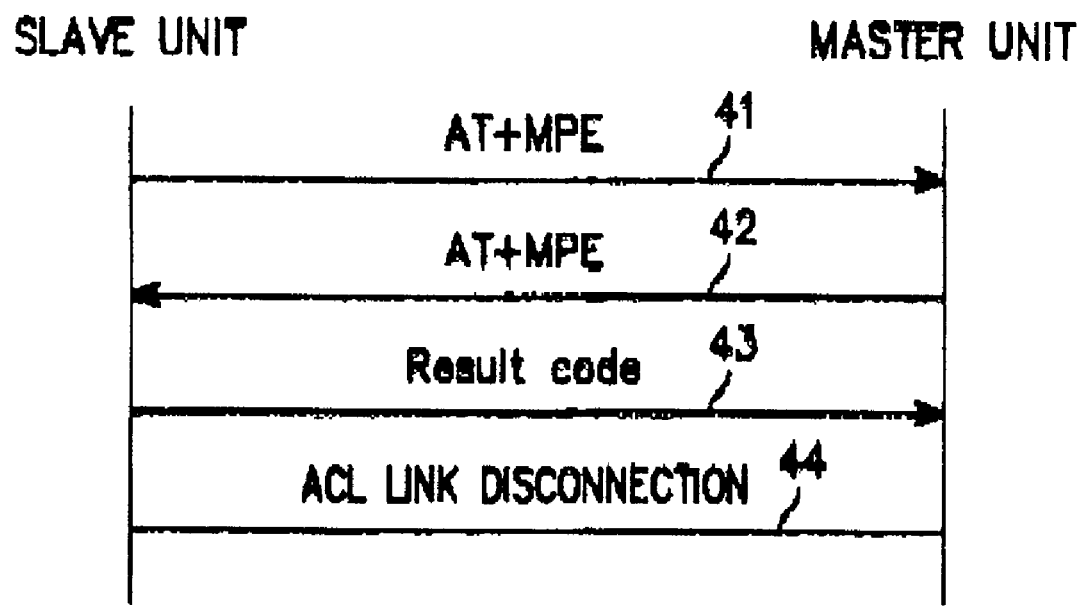
FIG. 4 illustrates an exemplary example of a preferred procedure for suspending transmission of data stored in memory of a master unit by a slave unit.

FIG. 4 illustrates the procedure by which the transmission of data is suspended by the request of a user during transmission of data through a radio link between a master 1 and slaves 2.

Referring to FIG. 4, the slave 2 transmits a message (AT+MPE) requesting suspension of data transmission to the master 1 through a remote controller (not shown) in step 41. The control unit 5 of the master 1 that has received the message (AT+MPE) transmits the same or similar message as the message (AT+MPE) to the slave 2 in order to check whether the message is correct or not in step 42. After the message transmitted from the master 1 is checked by the slave 2, the confirmation message (Result Code) is transmitted by the slave 2 to the master 1 in step 43. The control unit 5 of the master 1 that has received the confirmation message causes disconnection of the established radio link in step 44.

Figure 6:
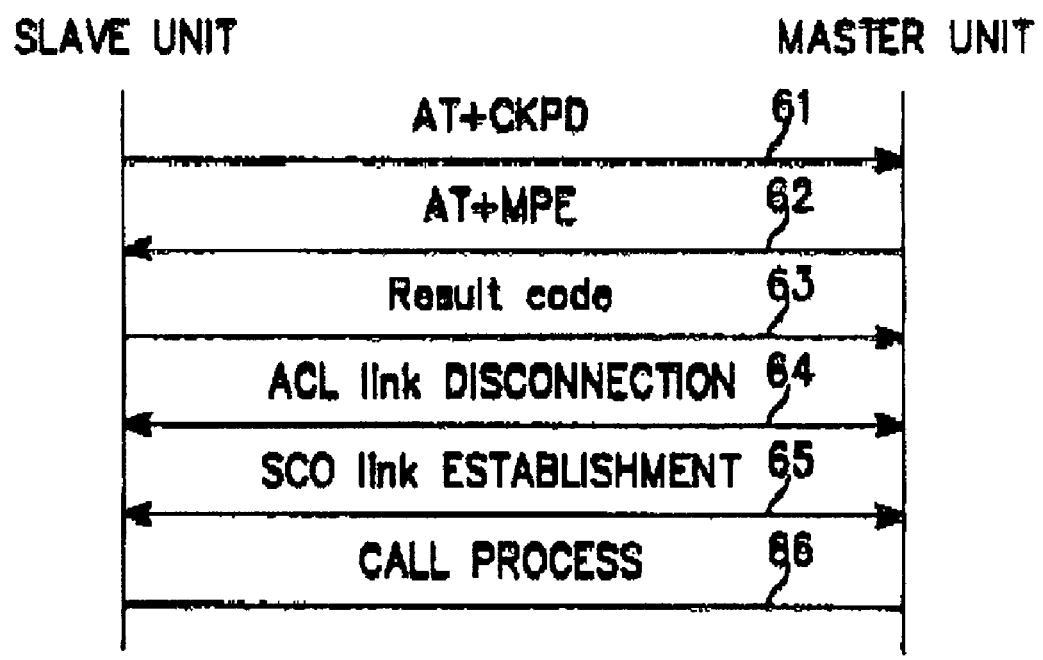
FIG. 6 illustrates an exemplary example of a preferred procedure for connecting a call path while a headset is receiving data stored in memory of a telephone if a call is demanded from the telephone.

FIG. 6 illustrates a procedure for establishing of a call path between the master 1 and the slave 2 during transmission of data through a radio link if the main part receives a call demand signal.

Referring to FIG. 6, step 61 shows that a user transmits a message requesting suspension of data transmission (AT+CKPD) through a remote controller (not shown) while the master 1 is transmitting data through a radio link. The master 1 transmits the message requesting suspension of data transmission (AT+MPE) to the slave 2 in step 62. The slave unit 2 transmits a message (Result Code) to check the message requesting suspension of data transmission (AT+CKPD) in step 63. According to said message, a radio link (ACL link) established between the master 1 and the slave 2 is released in step 64. After the radio link for transmitting high speed data is released, the SCO link for voice communication is established for a call connection in step 65 and the call is processed in step 66.

Figure 7:
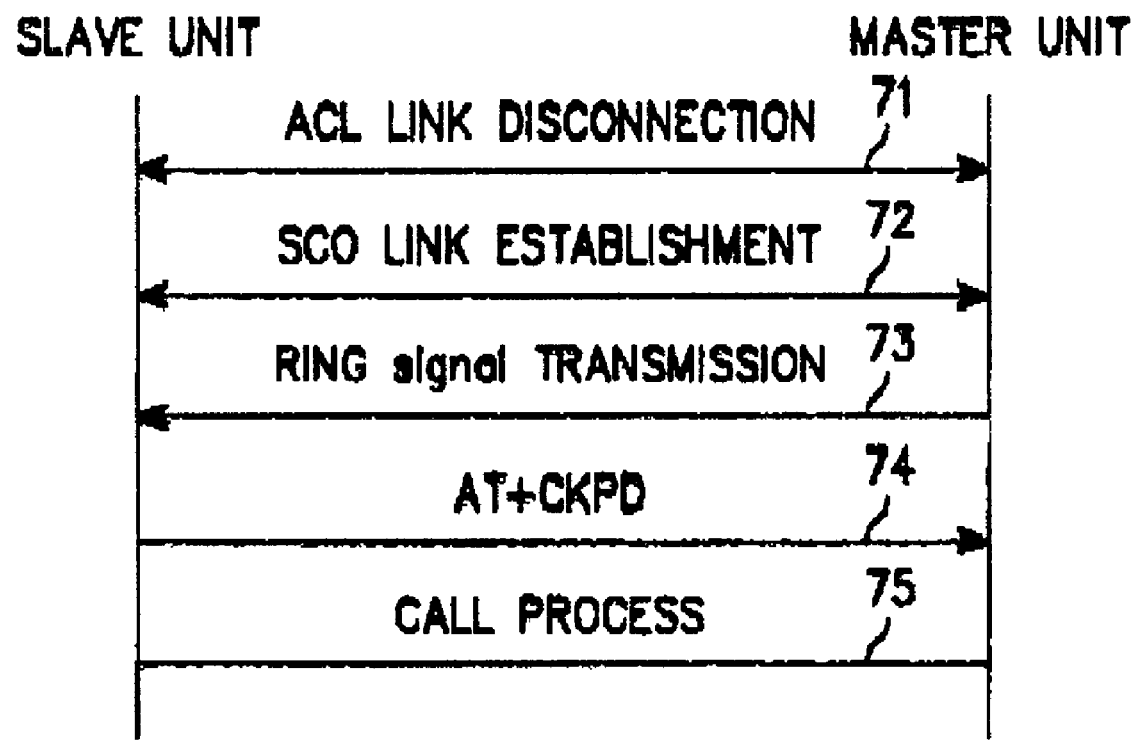
FIG. 7 illustrates another procedure for connecting a call path while a headset is receiving data stored in memory of a telephone if a call is demanded from the telephone.

FIG. 7 illustrates another procedure for connecting a call path in the case where a call request signal is generated during transmission of data through a radio link between the master 1 and the slave 2.

Referring to FIG. 7, when the master 1 receives a call request signal, the control unit 5 of the master 1 causes release of the established radio link in step 71. If the radio link for transmitting high speed data is released, the SCO link for transmitting voice or low speed data is established for call connection between the master 1 and the slave 2 in step 72. A ring signal is transmitted to the slave unit 2 through the established SCO link in step 73. After the slave 2 receives the Ring signal, the slave unit 2 transmits a message (AT+CKPD) to have the master 1 receive the call at the master 1 through a remote controller (not shown) in step 74, and the call is processed in step 75.

In the above step 74, if a user does not want to receive a phone call, the user can continuously keep receiving data instead of receiving the phone call as the message requesting suspension of the phone call being received is transmitted to the master 1.

The above description of the preferred embodiment is provided to enable any person skilled in the art to make or use the present invention. Various modifications to these embodiments will be readily apparent to those skilled in the art, and the generic principles defined herein may be applied to other embodiment without inventive steps. For example, the second decoder 15 of the slave 2 can be replaced by other decoders being capable of decoding picture data as well as MP3 files. Thus, the present invention is not intended to be limited to the embodiment shown here but is to be accorded the widest scope consistent with the claims appended hereto.

What is claimed is:

1. In a short-range mobile communication system for communicating through a selected radio link between a master and at least one slave, a method for fast transmission of data stored in a memory of the master to the slave through the selected radio link, comprising the steps of:
   requesting transmission of data stored in the memory of the master;
   establishing a selected radio link between the master and the slave in response to the request for transmission of data;
   transmitting indexing information related to the kinds of data stored in the memory of the master through the selected radio link;
   transmitting data corresponding to the indexing information selected to the slave through the radio link.

2. The method for fast transmission of data as recited in claim 1, further comprising the step of sending a message requesting transmission of data to a control unit of the master, and transmitting data stored in the memory of the master to the slave through the selected radio link in response to the request message.

3. The method for fast transmission of data as recited in claim 1, wherein the indexing information includes the size, title, and numbering of data stored in the memory of the master.

4. The method for fast transmission of data as recited in claim 1, further comprising decoding data in the slave and outputting data that is received through the selected radio link.

5. The method for fast transmission of data as recited in claim 1, wherein the selected radio link is one of infrared communication, or microwave communication, or asynchronous connection-less link being capable of high speed data transmission.

6. A slave device for receiving data stored in a memory of a main part through one of a low speed radio link for transmitting voice data or low speed data, or a high speed radio link for transmitting high speed data, comprising:
   a short-range radio receiver for receiving data through a selected one of the high speed and low speed radio link;
   a first decoder for decoding voice data or low speed data when the selected radio link is a low speed radio link for transmitting voice data or low speed data;
   a second decoder for decoding high speed data when the selected radio link is a high speed radio link for transmitting high speed data; and
   a converter for converting data decoded by the first or second decoder into audio data.

7. The slave device as recited in claim 6, wherein one of the high speed radio link and the low speed radio link are selected by a control unit of the master.

8. The slave device as recited in claim 6, wherein the short-range radio receiver includes an antenna for receiving signals transmitted through the selected radio link, a transceiver for converting the received signal into digital data, a baseband for processing data provided by the transceiver, and a memory for storing programs for controlling the operation of the baseband.

9. The slave device as recited in claim 6, wherein the first decoder comprises a PCM decoder for decoding voice data or a low speed data.

10. The slave device as recited in claim 6, wherein the second decoder comprises an MP3 decoder for decoding MP3 files.

11. The slave device as recited in claim 6, wherein the converter is a speaker for outputting voice data provided by the first decoder.

12. The slave device as recited in claim 6, wherein the converter further includes a earphone for listening to data output from the first decoder and the second decoder.

13. The slave device as recited in claim 6, further including a remote controller having a function button for controlling reproducing speed, and for selecting MP3 files stored in the memory of the master.

* * * * *